(12) United States Patent
Bablumyan

(10) Patent No.: US 11,789,265 B2
(45) Date of Patent: Oct. 17, 2023

(54) WAVEGUIDE IMAGE COMBINERS FOR AUGMENTED REALITY DISPLAYS

(71) Applicant: A9.com, Inc., Palo Alto, CA (US)

(72) Inventor: Arkady Bablumyan, Tucson, AZ (US)

(73) Assignee: A9.com, Inc., Palo Alto, CA (US)

( * ) Notice: Subject to any disclaimer, the term of this patent is extended or adjusted under 35 U.S.C. 154(b) by 239 days.

(21) Appl. No.: 17/018,981

(22) Filed: Sep. 11, 2020

(65) Prior Publication Data

US 2020/0409145 A1 Dec. 31, 2020

Related U.S. Application Data

(63) Continuation-in-part of application No. 16/917,368, filed on Jun. 30, 2020, now Pat. No. 11,668,935,
(Continued)

(51) Int. Cl.
*G02B 27/01* (2006.01)
*G02B 27/42* (2006.01)
*G02B 27/00* (2006.01)

(52) U.S. Cl.
CPC ..... *G02B 27/0103* (2013.01); *G02B 27/0081* (2013.01); *G02B 27/4205* (2013.01);
(Continued)

(58) Field of Classification Search
CPC ............ G02B 27/0103; G02B 27/0081; G02B 27/4205; G02B 2027/0105; G02B 2027/0123; G02B 5/1828; G02B 6/0036
See application file for complete search history.

(56) References Cited

U.S. PATENT DOCUMENTS 6,906,836 B2   6/2005 Parker et al.
8,233,204 B1   7/2012 Robbins et al.
(Continued)

FOREIGN PATENT DOCUMENTS

WO   WO2016020643 A1   2/2016
WO      2017102795 A1   6/2017
(Continued)

OTHER PUBLICATIONS

Shen, Zhongwen, "Characterization and Optimization of Field of View in a Holographic Waveguide Display," IIEEE Photonics Journal, vol. 9, No. 6, Dec. 2017.
(Continued)

*Primary Examiner* — Kimberly N. Kakalec
(74) *Attorney, Agent, or Firm* — Kilpatrick Townsend & Stockton LLP

(57) ABSTRACT

A waveguide image combiner is used to transmit a monochrome or full-color image in an augmented reality display. The combiner uses multiple stacked waveguides, each having top and bottom substrates. The combiner also uses multiple pairs of incoupling and outcoupling VHOEs, which are sandwiched between the top and bottom substrates, to expand a first FOV and an image expander to expand the second or perpendicular FOV. This suitably provides an expanded FOV that offers a diagonal FOV$\geq$50°, a horizontal FOV$\geq$40 and a vertical FOV$\geq$25°. The combiner also delivers a large horizontal eye box up to 20 mm and a vertical eye box of 10 mm while maintaining high light efficiency of the real scene (e.g. >80%). The system is able to use a light engine based on broadband (10 nm$\leq\Delta\lambda\leq$40 nm) LEDs and maintain a large horizontal field of view and high transmission of the real imagery.

20 Claims, 15 Drawing Sheets

Related U.S. Application Data which is a continuation-in-part of application No. 16/832,611, filed on Mar. 27, 2020, which is a continuation-in-part of application No. 16/041,347, filed on Jul. 20, 2018, now Pat. No. 10,859,833.

(60) Provisional application No. 62/547,411, filed on Aug. 18, 2017.

(52) U.S. Cl.
CPC ............. *G02B 2027/0105* (2013.01); *G02B 2027/0123* (2013.01)

(56) References Cited

U.S. PATENT DOCUMENTS

| | | | |
|---|---|---|---|
| 9,513,480 | B2 | 12/2016 | Saarikko et al. |
| 10,859,833 | B2 | 12/2020 | Bablumyan |
| 2006/0126179 | A1* | 6/2006 | Levola ............... G02B 27/4272 359/563 |
| 2006/0132914 | A1 | 6/2006 | Weiss et al. |
| 2006/0228073 | A1* | 10/2006 | Mukawa ................. G02B 5/18 385/31 |
| 2006/0291021 | A1 | 12/2006 | Mukawa |
| 2009/0245730 | A1 | 10/2009 | Kleemann |
| 2009/0303212 | A1 | 12/2009 | Akutsu et al. |
| 2011/0096401 | A1 | 4/2011 | Levola |
| 2012/0033306 | A1 | 2/2012 | Valera et al. |
| 2013/0051730 | A1* | 2/2013 | Travers ............... G02B 27/4272 385/37 |
| 2014/0104665 | A1 | 4/2014 | Popovich et al. |
| 2015/0016777 | A1 | 1/2015 | Abovitz et al. |
| 2015/0277117 | A1 | 10/2015 | Yamada et al. |
| 2015/0293358 | A1 | 10/2015 | de Matos Pereira Vieira et al. |
| 2016/0041387 | A1* | 2/2016 | Valera ................ G02B 27/0101 385/36 |
| 2016/0116739 | A1 | 4/2016 | TeKolste et al. |
| 2016/0124229 | A1 | 5/2016 | Yokoyama |
| 2016/0131912 | A1 | 5/2016 | Border et al. |
| 2016/0320536 | A1 | 11/2016 | Simmonds et al. |
| 2017/0052377 | A1* | 2/2017 | Amitai ................. G02B 27/285 |
| 2017/0235142 | A1* | 8/2017 | Wall ......................... G02B 5/26 359/633 |
| 2017/0276948 | A1 | 9/2017 | Welch et al. |
| 2018/0275350 | A1 | 9/2018 | Oh et al. |
| 2018/0284460 | A1* | 10/2018 | Cheng ................ G02B 27/0944 |
| 2018/0299678 | A1 | 10/2018 | Singer et al. |
| 2019/0285897 | A1 | 9/2019 | Topliss et al. |
| 2020/0341280 | A1 | 10/2020 | Bablumyan et al. |

FOREIGN PATENT DOCUMENTS

| | | | |
|---|---|---|---|
| WO | WO2017102795 | A1 | 6/2017 |
| WO | WO2017180403 | A1 | 10/2017 |
| WO | WO-2018031634 | A1 * | 2/2018 |
| WO | WO2018209108 | A2 | 11/2018 |

OTHER PUBLICATIONS

Piao, Jing-Ai, "Full Color Holographic Optical Element Fabrication for Waveguide-type Head Mounted Display Using Photopolymer," Journal of the Optical Society of Korea, vol. 17, No. 3, Jun. 2013, pp. 242-248.

Guo, Jingjing, "Design of a multiplexing grating for color holographic waveguide," SPIE, Optical Engineering 54(12) 125105, Dec. 2015.

Barden et al, "Volume-Phase Holographic Gratings and the Efficiency of Three Simple Volume-Phase Holographic Gratings," Publications of the Astronomical Society of the Pacific, 112:809-820,Jun. 2000.

Zhou et al., "See-through near-eye displays enabling vision correction," Optical Society of America, Jan. 25, 2017.

Bigler et al., "Holographic Waveguide HUD with in-line pupil expansion and 2D FOV expansion" Optical Society of America, 2019.

Close, D.H., Holographic Optical Elements, Optical Engineering, vol. 14, No. 5, Sep.-Oct. 9, 1975.

Augmented Reality Module (AR Module), Product Brief, WaveOptics, 2018.

Hunsperger, R.G., "Optical Waveguide Modes," Integrated Optics, DOI 10.1 007/b98730 2, Springer Science +Business Media, LLC 2009.

Wang et al., "Optical Design of Waveguide Holographic Binocular Display for Machine Vision," Applied Mechanics and Materials ISSN: 1662-7482, vols. 427-429, pp. 763-769, Sep. 27, 2013.

Guo et al., "Holographic waveguide display with a combined-grating in-coupler," Optical Society of America, Nov. 9, 2016.

U.S. Appl. No. 16/917,368, "Notice of Allowance," dated Jan. 30, 2023, 9 pages.

U.S. Appl. No. 16/823,611, "Notice of Allowance," dated Feb. 16, 2023, 12 pages.

U.S. Appl. No. 16/832,611, "Non-Final Office Action." dated Apr. 22, 2022, 16 pages.

U.S. Appl. No. 16/917,368, "Non-Final Office Action," dated Apr. 26, 2022, 19 pages.

Levola , "Diffractive Optics for Virtual Reality Displays", Journal of the Society for Information Display, vol. 14, No. 5, May 2006, pp. 467-475.

U.S. Appl. No. 16/832,611, "Final Office Action," dated Oct. 12, 2022, 17 pages.

U.S. Appl. No. 16/917,368, "Non-Final Office Action," dated Oct. 13, 2022, 19 pages.

\* cited by examiner

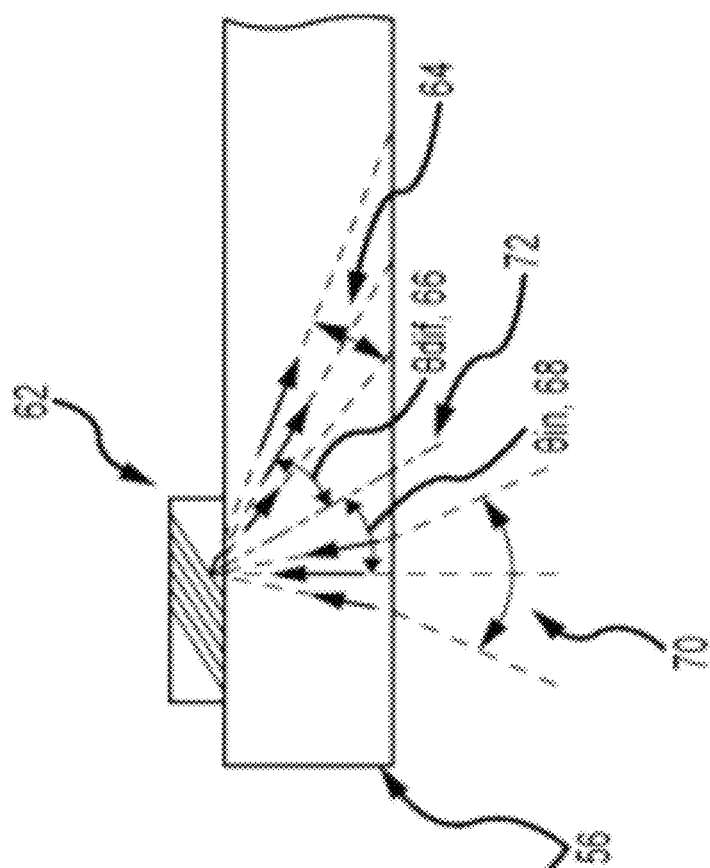
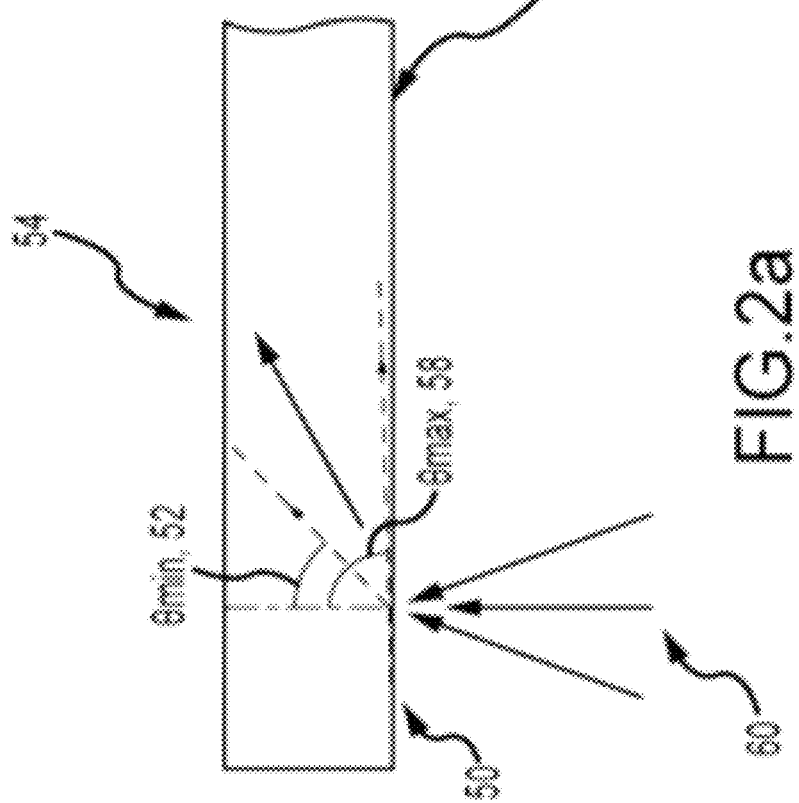

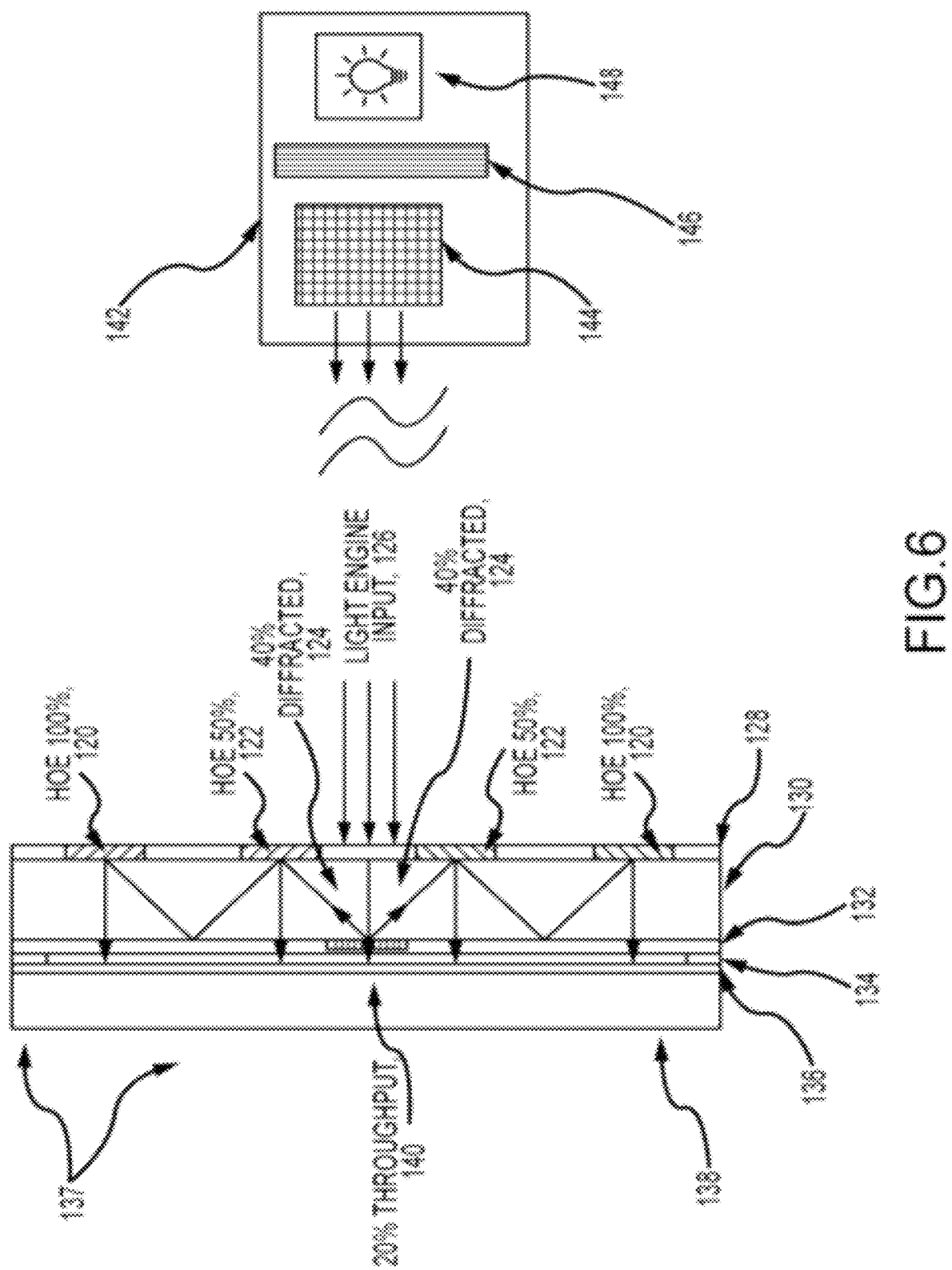

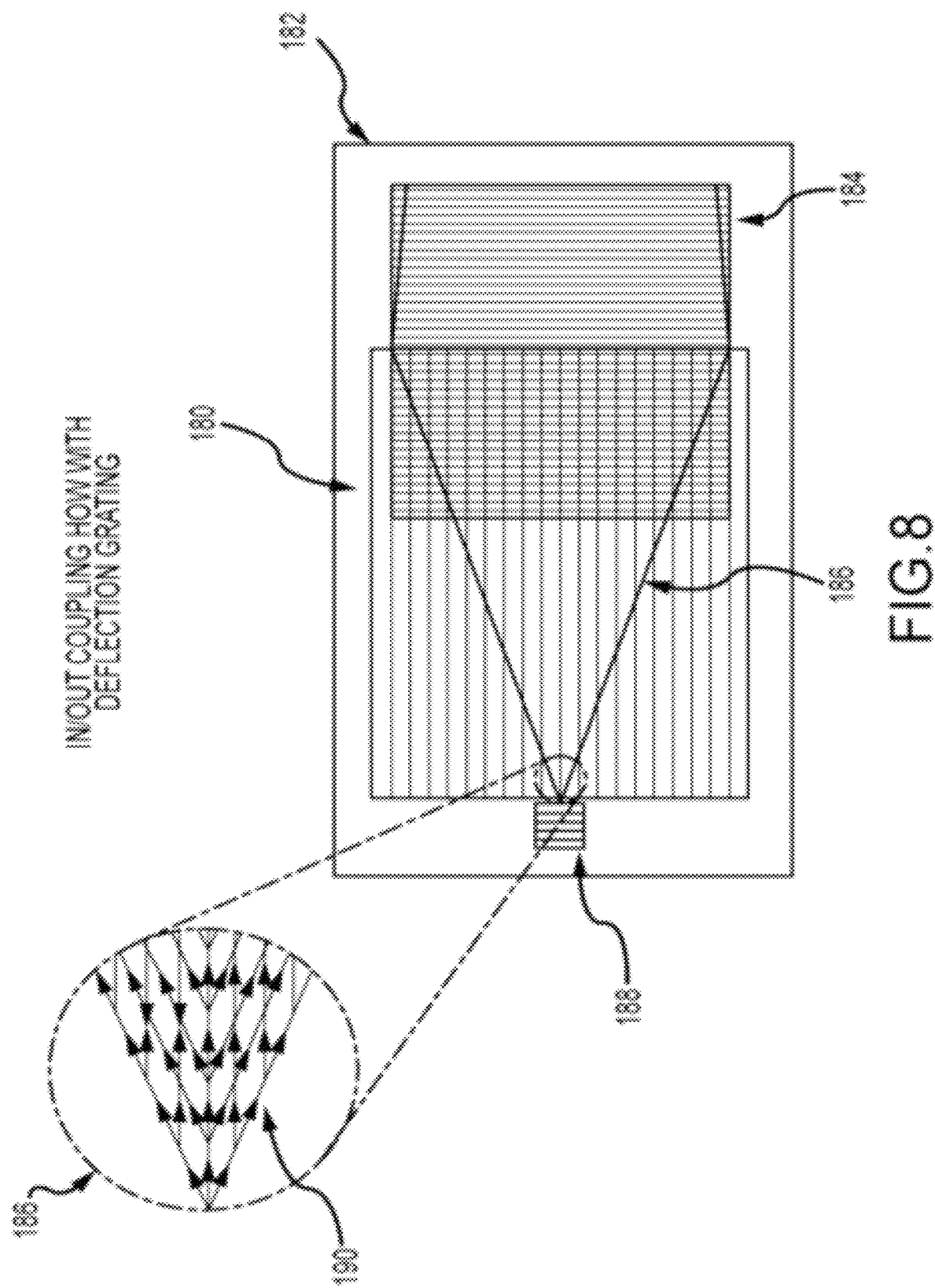

WAVEGUIDE IMAGE COMBINERS FOR AUGMENTED REALITY DISPLAYS

CROSS-REFERENCES TO RELATED APPLICATIONS

This application is a continuation-in-part, and claims benefit of U.S. patent application Ser. No. 16/917,368, filed Jun. 30, 2020, which is a continuation-in-part of U.S. patent application Ser. No. 16/832,611, filed Mar. 27, 2020, which is a continuation-in-part of U.S. patent application Ser. No. 16/041,347, filed Jul. 20, 2018, which is a non-provisional of U.S. Provisional Application No. 62/547,411, filed Aug. 18, 2017, the specifications of which are incorporated herein in their entirety by reference.

BACKGROUND OF THE INVENTION

Field of the Invention

This invention relates to waveguide image combiners for combining real imagery and auxiliary content to generate an augmented reality display.

Background Art

Combining computer-generated imagery with real imagery exists in a continuous range described as the reality-virtuality continuum. At one end of the continuum exists "reality", the image reaching the viewer's eye has no computer generated information. At the other end is "virtual reality" where all the information reaching the viewer's eye is displayed by a computer. Within the continuum is mixed or augmented reality where light from a light engine is combined with the real imagery and both reach the viewer's eye. This "auxiliary content" projected by the light engine may include one or more of computer generated imagery, a live or recorded video feed, text or other analog or digital information. In augmented reality applications, the auxiliary scene and the view of the outside world need to be combined and integrated into the observer's field of view (FOV). There are numerous techniques of beam combining that can change the auxiliary content propagation direction in such a way that one can see the auxiliary content and the outside world at the same time.

Augmented display systems are comprised of several subsystems including an image engine that generates the auxiliary content, a light input subsystem that couples the auxiliary content into the viewing device, and a light output subsystem that couples light from the device and transmits the real scene to the viewer's eye. These subsystems are combined into glasses, helmets, or heads up display devices. The glasses-based systems are often called near-to-eye (NTE) displays or NED. If the system combines auxiliary content with a view of the outside world, an image combiner is required to allow the viewer to see both the auxiliary and real content simultaneously. To provide the viewer with the most realistic experience possible, the image combiner and display system should provide a horizontal and vertical FOV that is as large as possible while maximizing the size of the "eye box"—output pupil size at the position of the eye. Current embodiments may have diagonal FOVs that are less than 40 degrees and eye boxes of less than 10 mm×10 mm, which negatively impacts the user's experience.

As shown in FIG. 1, one of the most elegant ways to build a waveguide image combiner is the use of waveguide (WG) holography. This technique uses an input Holographic Optical Element (HOE) 14 to trap through total internal reflection (TIR) auxiliary content 32 generated by an image engine 10 inside a transparent substrate 12 where auxiliary content 32 propagates away from the image engine and is outcoupled toward the viewer's eye 24 by an output HOE 20. Both the input and output HOEs are transparent across the entire visible range except for an approximately 20% reduction in transmission across the bandwidth of the broadband RGB light sources. This allows the viewer to see the real imagery 18 and the auxiliary content 32. The light engine and output HOEs emit within a cone of light 28.

The waveguide image combiner has an eye box 26 in the horizontal and vertical directions. The eye box is the vertical and horizontal distance where the viewer's pupil receives all the angles emitted by the light engine. A large eye box is desirable for accommodating eye movement, physical variation among viewers, and mechanical tolerances. As the viewer's pupil moves outside the eye box, the image becomes degraded. Eye relief 22 is the distance between the substrate surface and the entrance pupil of the viewer's eye. For maximum comfort, this distance should be ≥15 mm.

The field-of-view (FOV) 30 is the angular size of the image determined by the geometric relationship between the size of the outcoupling HOE and the distance between the pupil and the surface of the outcoupling HOE. Holographic optical element is a general term that describes a functional diffractive structure that transforms the waveform of the input beam into an output beam. A volume holographic element (VHOE) is a type of HOE that operates in the Bragg diffraction regime. A waveguide image combiner represents the optical system that includes all the optical elements in the optical path from the exit aperture of the light engine to the plane where light enters the eye.

Due to the delicate nature of VHOEs, a protective layer of material is typically applied or positioned overtop of the VHOEs so as to provide mechanical protection. Waveguide image combiners with multiple stacked waveguides can end up having multiple protective layers, which increase the weight and thickness of the system. It is a goal of the present invention to provide for mechanical protection of the VHOEs while optimizing image performance and minimizing the total weight and thickness of the system.

BRIEF SUMMARY OF THE INVENTION

It is an objective of the present invention to provide systems, devices, and methods, that allow for large FOV waveguide image combiners, as specified in the independent claims. Embodiments of the invention are given in the dependent claims. Embodiments of the present invention can be freely combined with each other if they are not mutually exclusive.

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

One embodiment of the present invention features a full-color (R, G, and B), large-FOV waveguide image combiner that consists of stacking multiple individual waveguides where the individual waveguides each include at least two optically transparent substrates with incoupling and outcoupling VHOEs sandwiched between them. An advantage of this embodiment is that the substrates provide mechanical protection for the VHOEs without increasing the weight or thickness of the system because the entire thickness of the waveguide is used for total internal reflectance (TIR). Another advantage of this embodiment is it allows either transmission hologram VHOEs or reflection hologram VHOEs to be used. An additional advantage of this embodiment is that it allows for the inclusion of an isolation layer which when used with a diffraction grating image expander such as a surface relief grating (SRG), enables selective transmission and reflection of desired diffraction orders to improve efficiency and distribution of outcoupled light. The present invention provided for the achievement of a full-color, large FOV image while also achieving better performance in areas such as efficiency, image uniformity, and image artifact minimization. The waveguide image combiner may provide an expanded horizontal and vertical FOV that offers a diagonal FOV of about 50° or greater. The combiner also delivers a large horizontal eye box of around 20 mm or greater and a vertical eye box of around 10 mm or greater while maintaining high light efficiency of the real scene (e.g. >80%). The system is able to use a light engine based on broadband (10 nm≤Δλ≤40 nm) LEDs and maintain high transmission of the real imagery.

In another embodiment, the present invention feature methods and devices for the alignment and fixation of multiple optically transparent substrates so as to act as a single waveguide. For example, the methods and devices may allow for a top substrate and a bottom substrate to be aligned and fixed such that a top surface of the top substrate and a bottom surface of the bottom substrate are parallel, and the resulting waveguide is configured for TIR which is bounded by the top surface of the top substrate and the bottom surface of the bottom substrate. As a non-limiting example, the present invention may feature a mechanical jig for holding two or more substrates in alignment, at a desired distance apart, while a material in the gap between the substrates cures or hardens. As another non-limiting example, the present invention may feature a method which involves measuring the light reflection from the top surface of the top substrate and the bottom surface of the bottom substrate so as to determine if the surfaces are parallel prior to or during curing or hardening of the inter-substrate material. As another non-limiting example, the present invention may feature a method which involves measuring the light which is incoupled, transmitted through the waveguide, and outcoupled, so as to determine if the surfaces are parallel (i.e. by positioning the substrates so as to maximize the intensity of the outcoupled light). These devices and methods may allow for the inter-substrate material to have a variable thickness which compensates for undesired irregularities in the substrates.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which:

FIGS. 2a and 2b, as described above, are diagrams of transmissive and reflection holograms, respectively, showing the range of angles that can propagate in the substrate;

FIG. 6 is a diagram of an embodiment of a Y-expander in which a transmission HOE is added to the substrate on the side of the image engine and exhibits a variable diffraction efficiency to allow uniform intensity to exit the input VHOE.

FIG. 8 is a diagram of another embodiment of the Y-expander in which a single film working for all angular ranges is used to distribute the light uniformly over the y-direction of the output HOE.

DETAILED DESCRIPTION OF THE INVENTION

Figure 1:
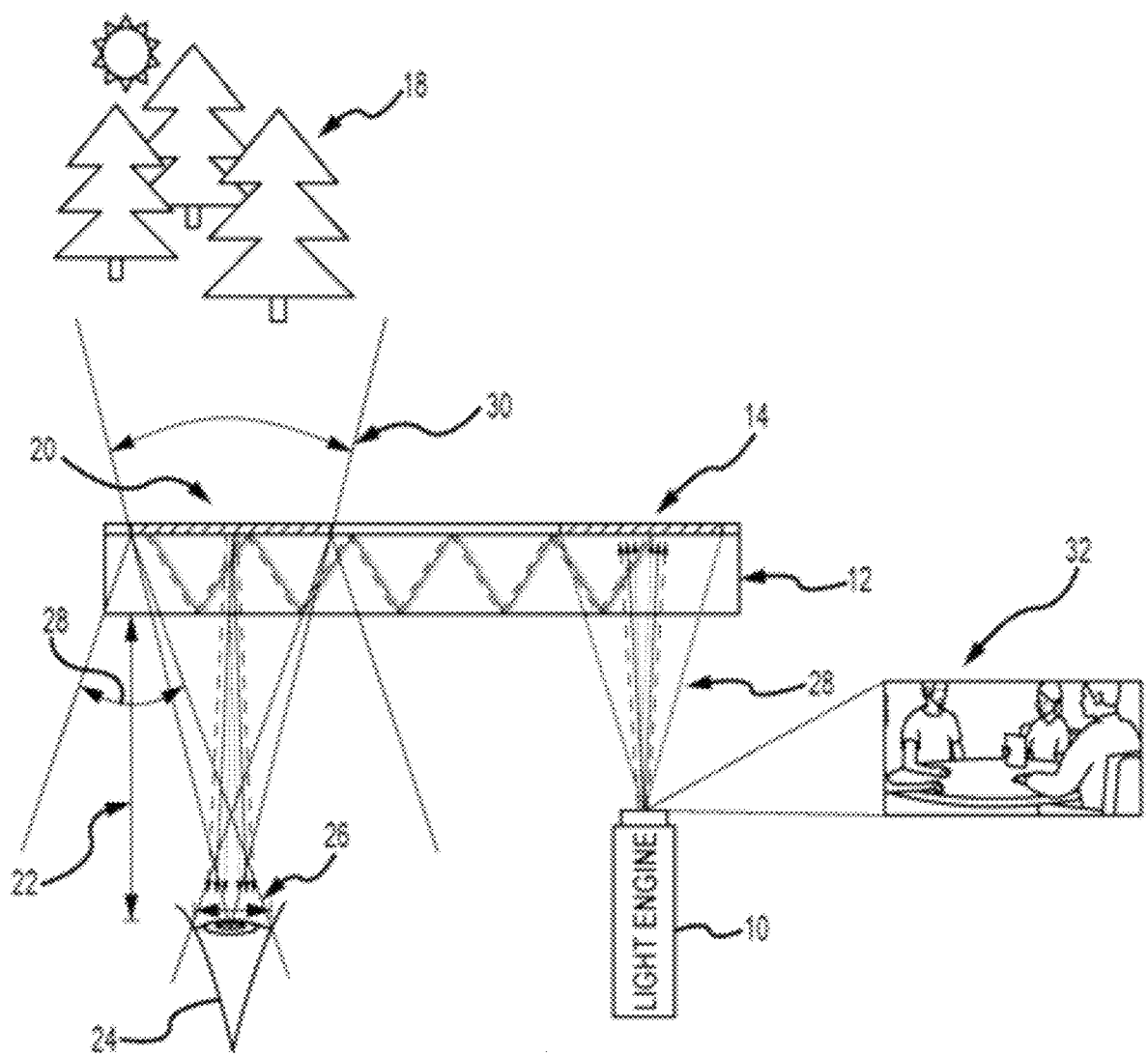
FIG. 1, as described above, is a drawing of an image combiner using waveguide holography.
Figure 3:
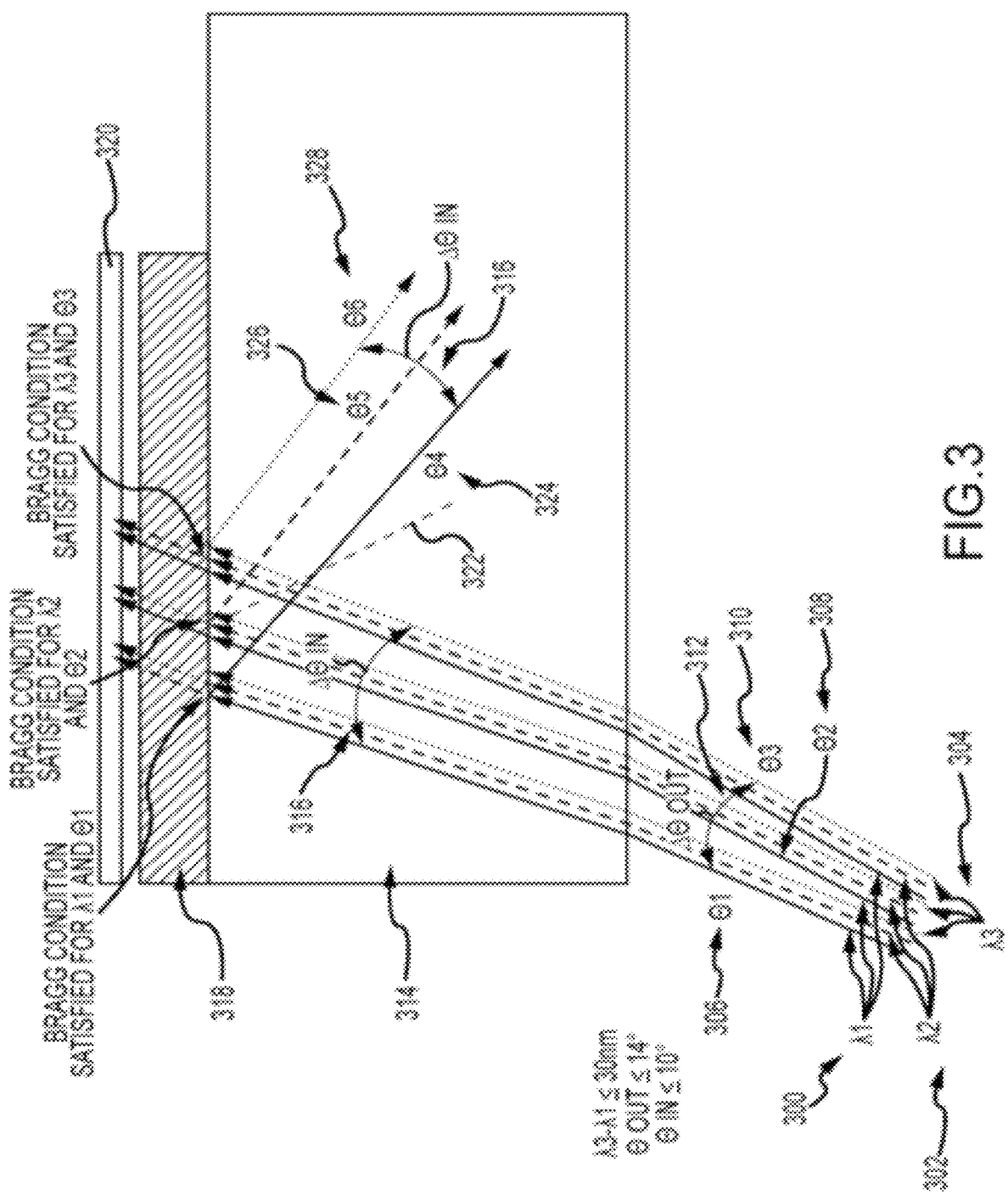
FIG. 3 is a diagram illustrating the expansion of the angular acceptance with broadband sources.
Figure 4:
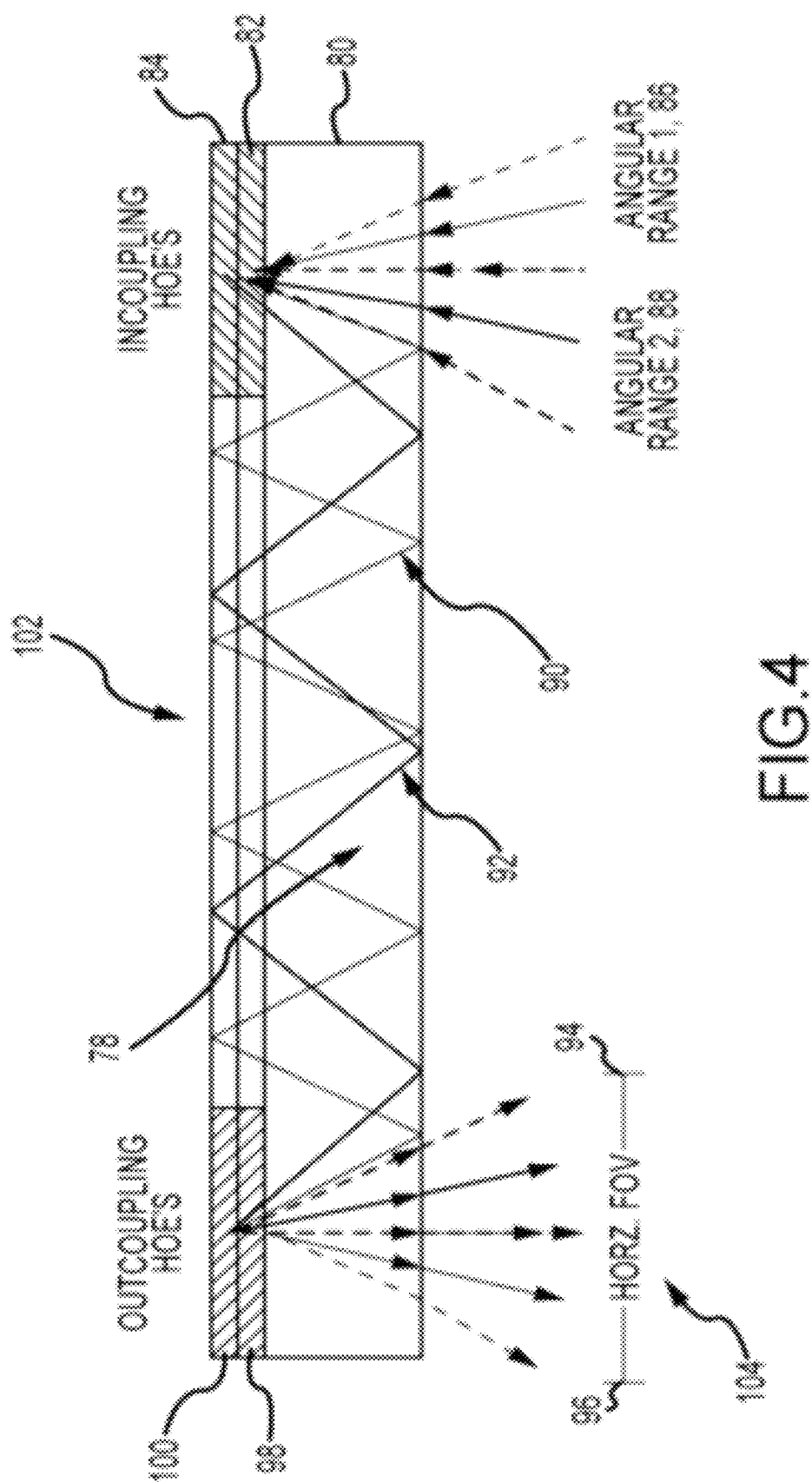
FIG. 4 is a diagram of an embodiment of an image combiner that physically overlaps two reflection input VHOE gratings tuned to different input angular ranges to expand the horizontal FOV.
Figure 5A:
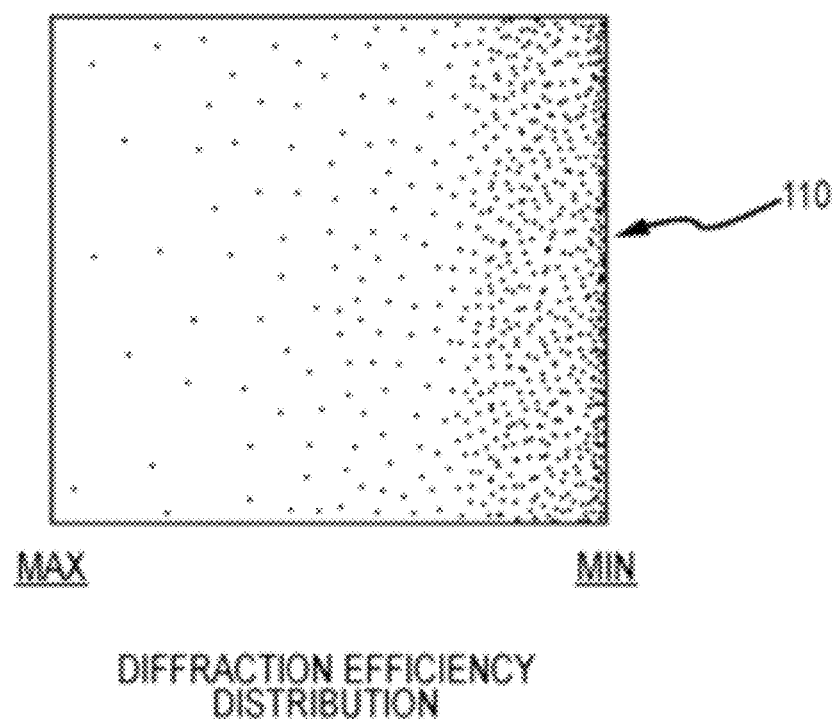
FIGS. 5a and 5b are diagrams showing the distribution of the diffraction efficiency for the output HOE in which the diffraction efficiency varies linearly along the propagation (horizontal) axis and is constant along the vertical axis to produce a uniform intensity of the auxiliary content as it exits the output VHOE.
Figure 5B:
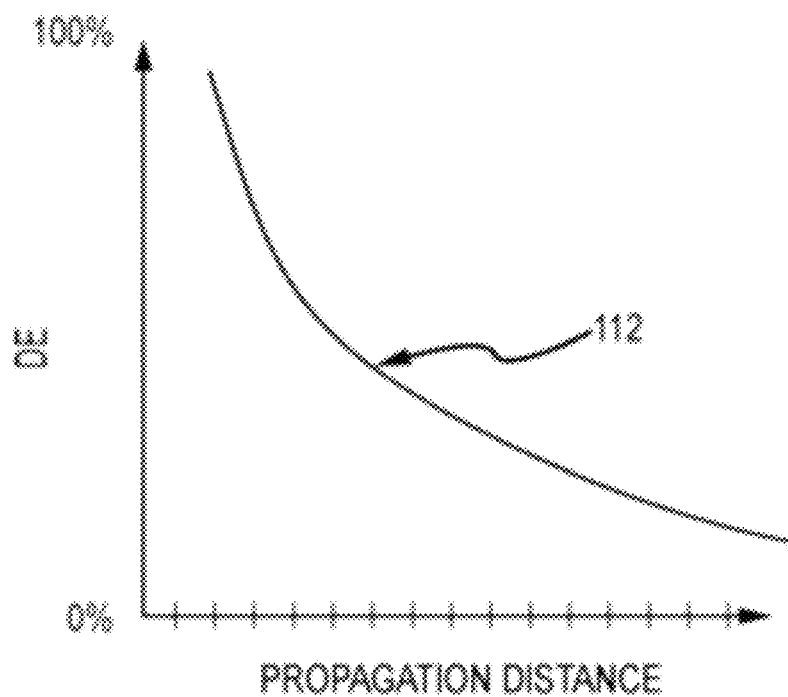
Figure 7:
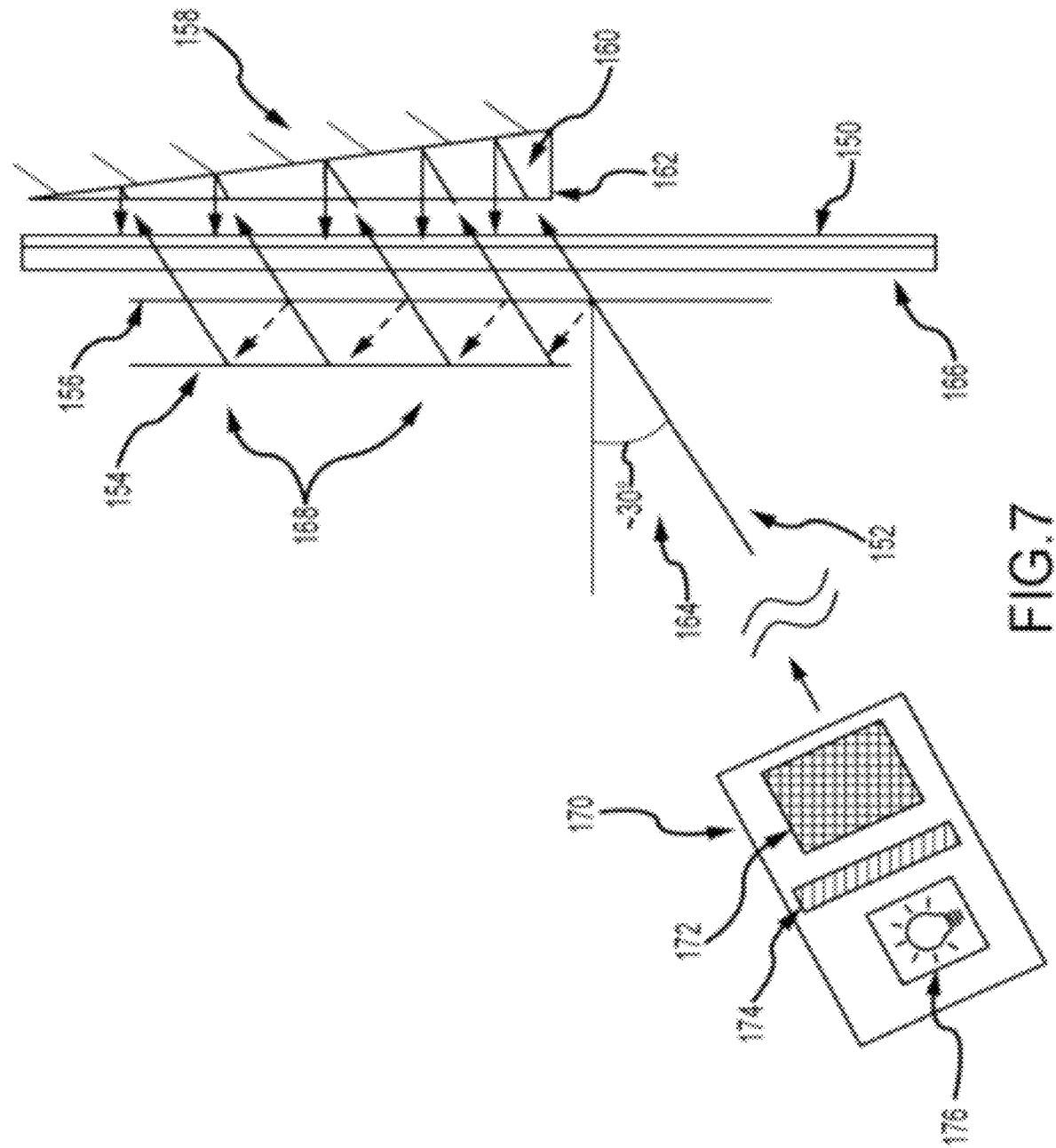
FIG. 7 is a diagram of another embodiment of the Y-expander in which a prism is added to the image engine side of the substrate and a gradient mirror and a fully reflecting mirror are added behind the reflection HOE to produce a uniform intensity for the light exiting the input HOE.
Figure 9A:
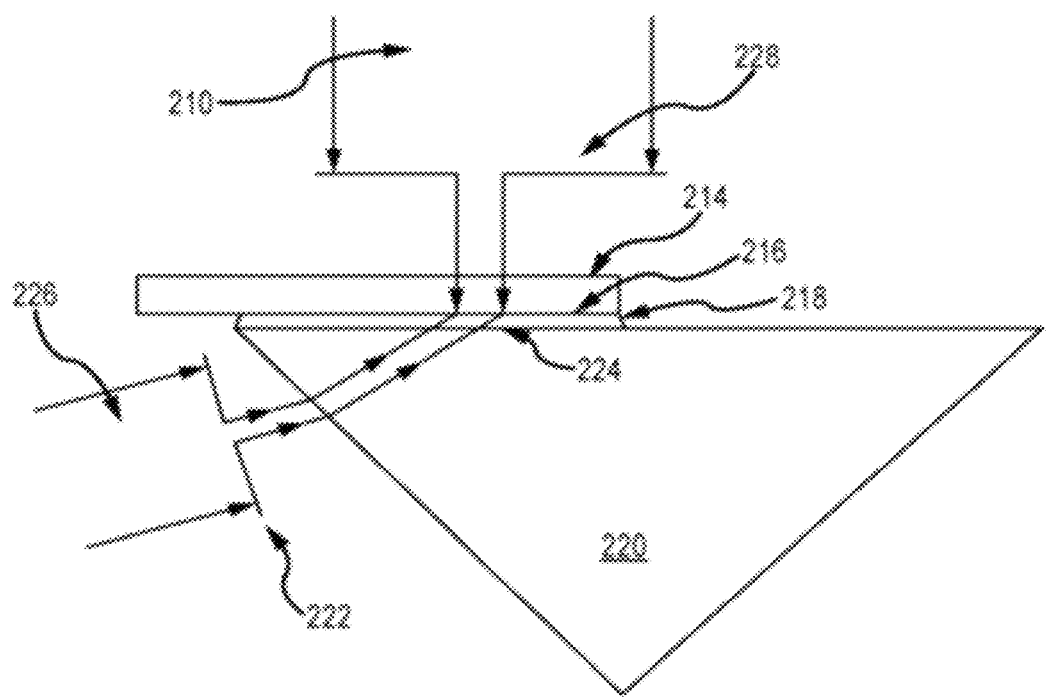
FIGS. 9a and 9b are diagrams of embodiments of recording setups and fixtures for recording the incoupling and outcoupling VHOEs, respectively.
Figure 9B:
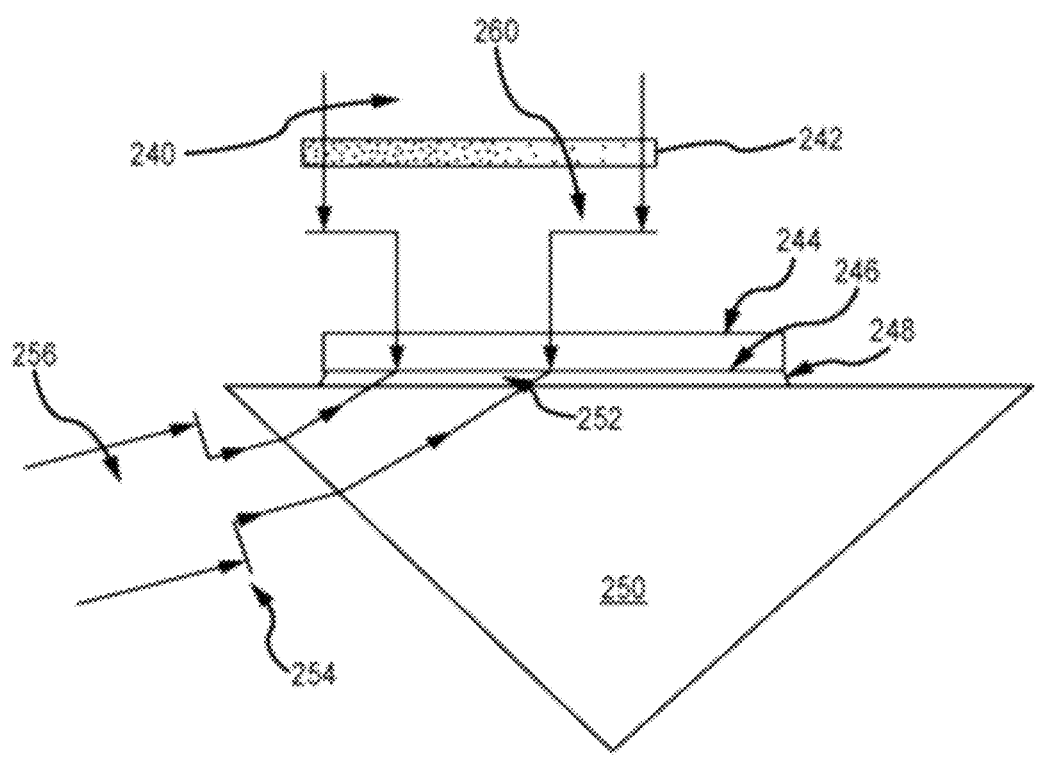
Figure 10:
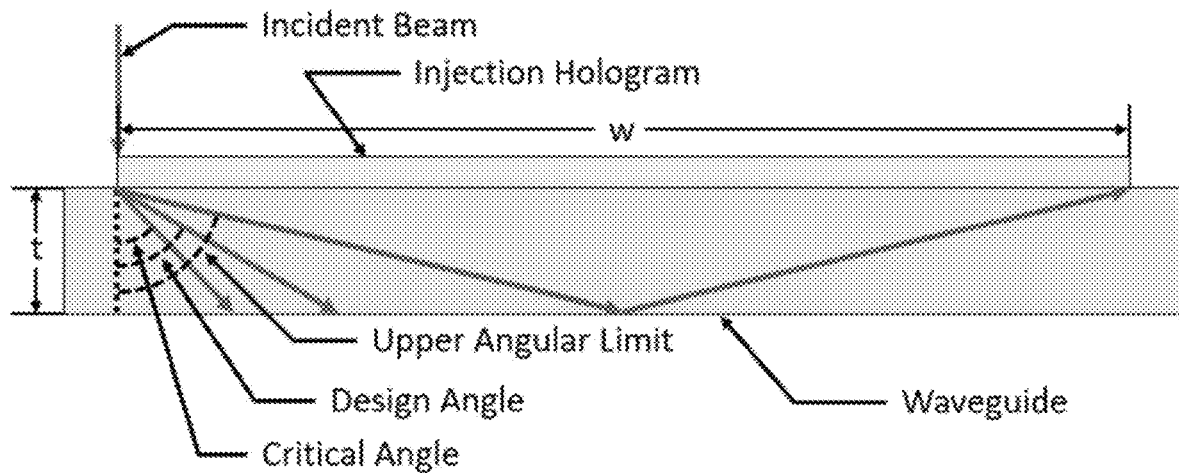
FIG. 10 shows an illustration of the selection of the propagation angle. The propagation angle is chosen to bisect the critical angle and the angle defined by Equation 1.
Figure 11:
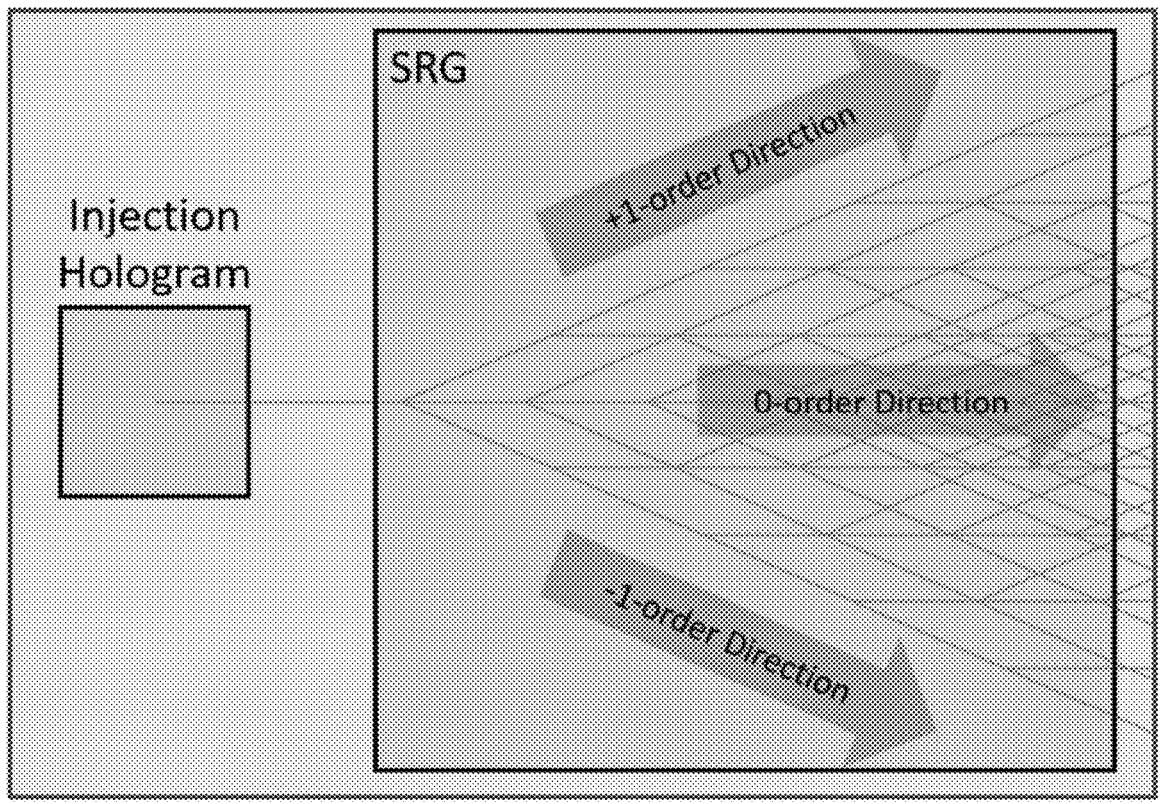
FIG. 11 shows an illustration of the cross-sectional splitting of incident light by the surface relief grating (SRG). After the first interaction with the grating, light is diffracted into +1, −1, and 0 diffraction orders. Light in the $0^{th}$ order is again split into the +1, −1, and $0^{th}$ orders, while light diffracted into the ±1 orders is not diffracted or diffracted back to the $0^{th}$ order direction.
Figure 12:
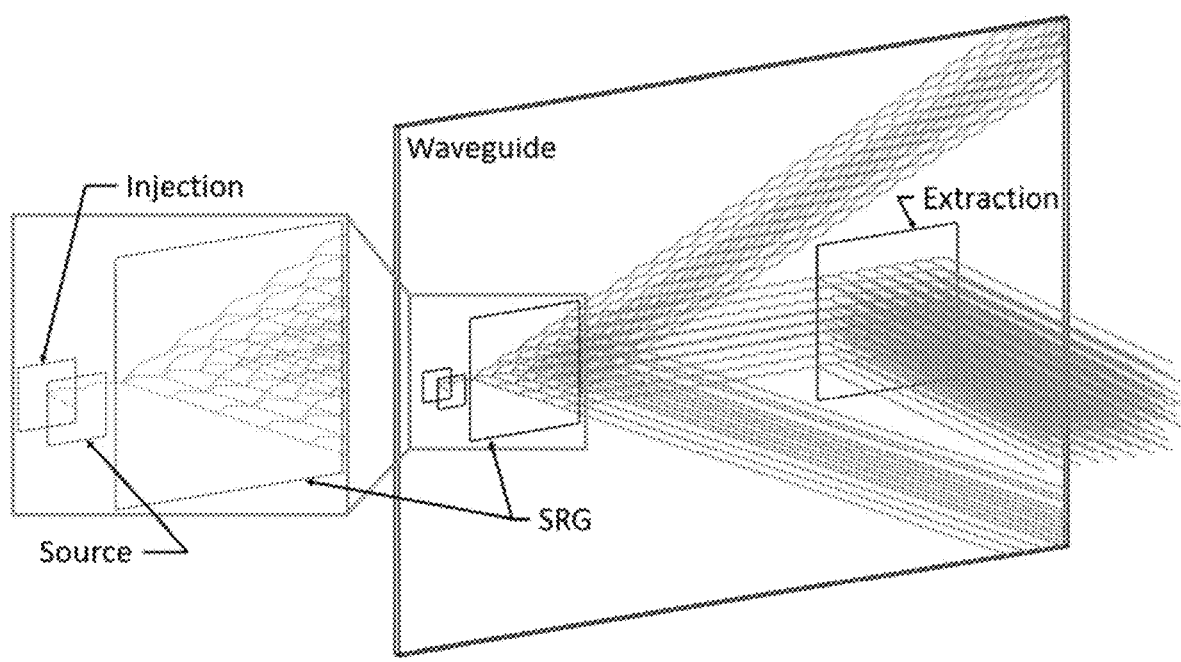
FIG. 12 shows an illustration of the image expansion due to a SRG of the present invention. Light incident from the source is diffracted at the design angle by the injection hologram. Light incident on the SRG is split into the +1, −1, and $0^{th}$ diffraction orders. Subsequent interactions with the SRG continue diffraction into one of the three propagation directions. The variable DE extraction hologram diffracts the expanded "$0^{th}$ order" toward the observer. The image inset provides an enlarged view of the branching diffraction that is caused by the SRG.
Figure 13:
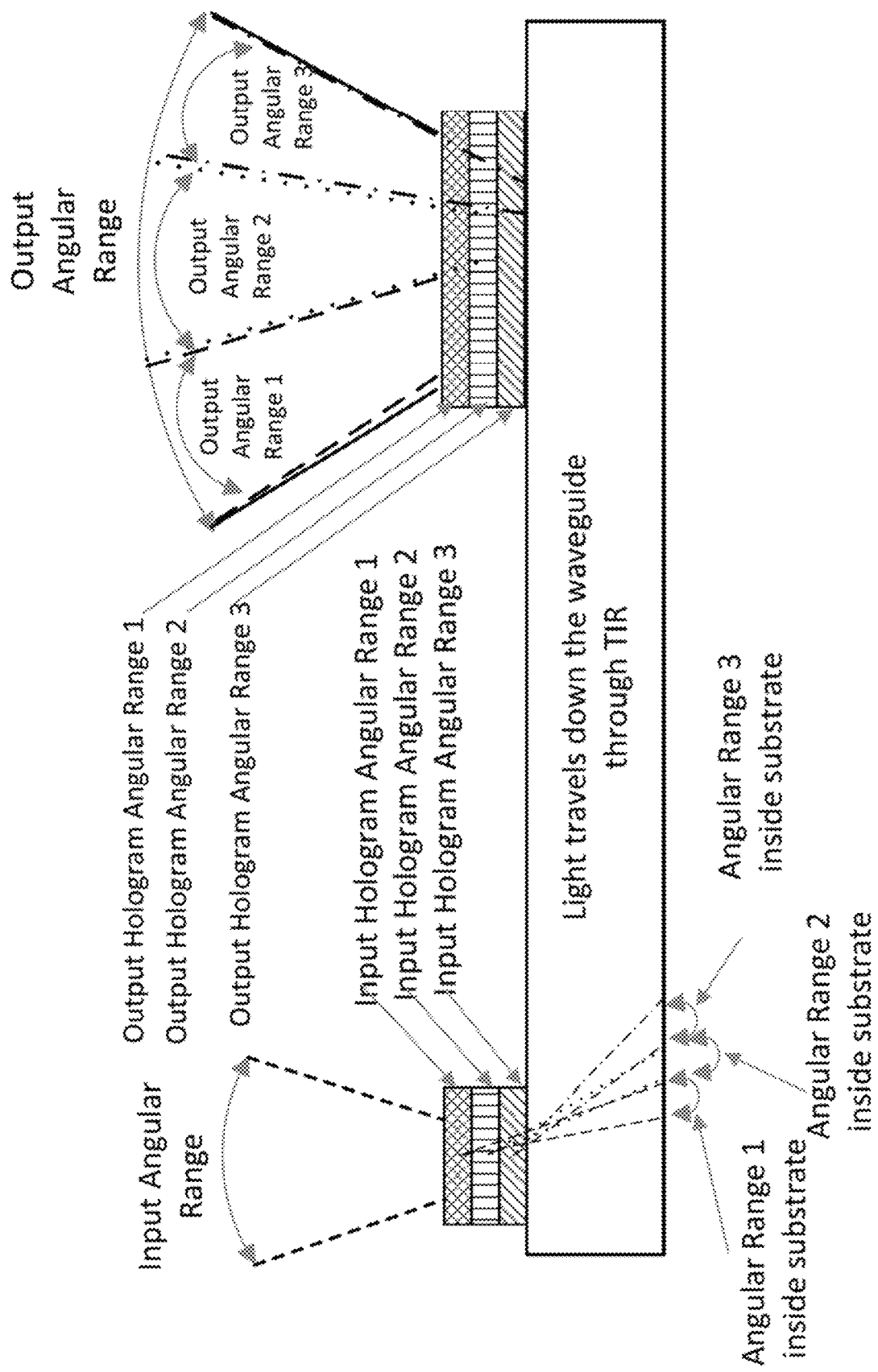
FIG. 13 shows an illustration of a waveguide image combiner with multiple stacked VHOEs corresponding to multiple angular ranges, on a single substrate.
Figure 14:
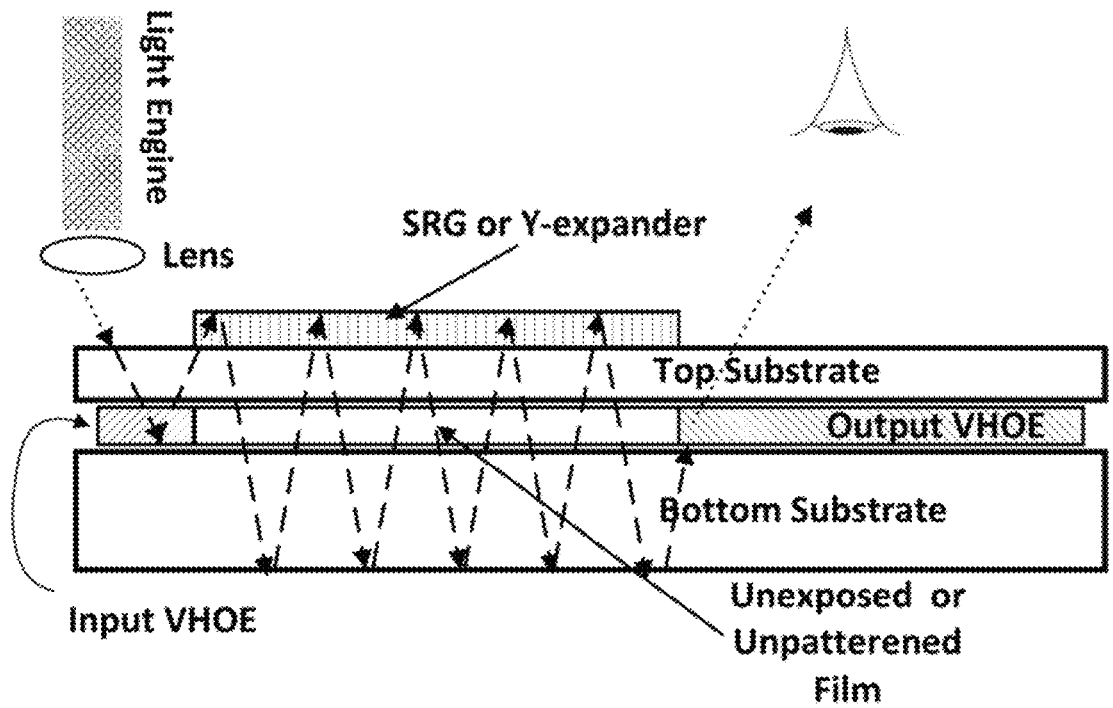
FIG. 14 shows a side view illustration of a waveguide with top and bottom substrates and an SRG or Y-expander.
Figure 15:
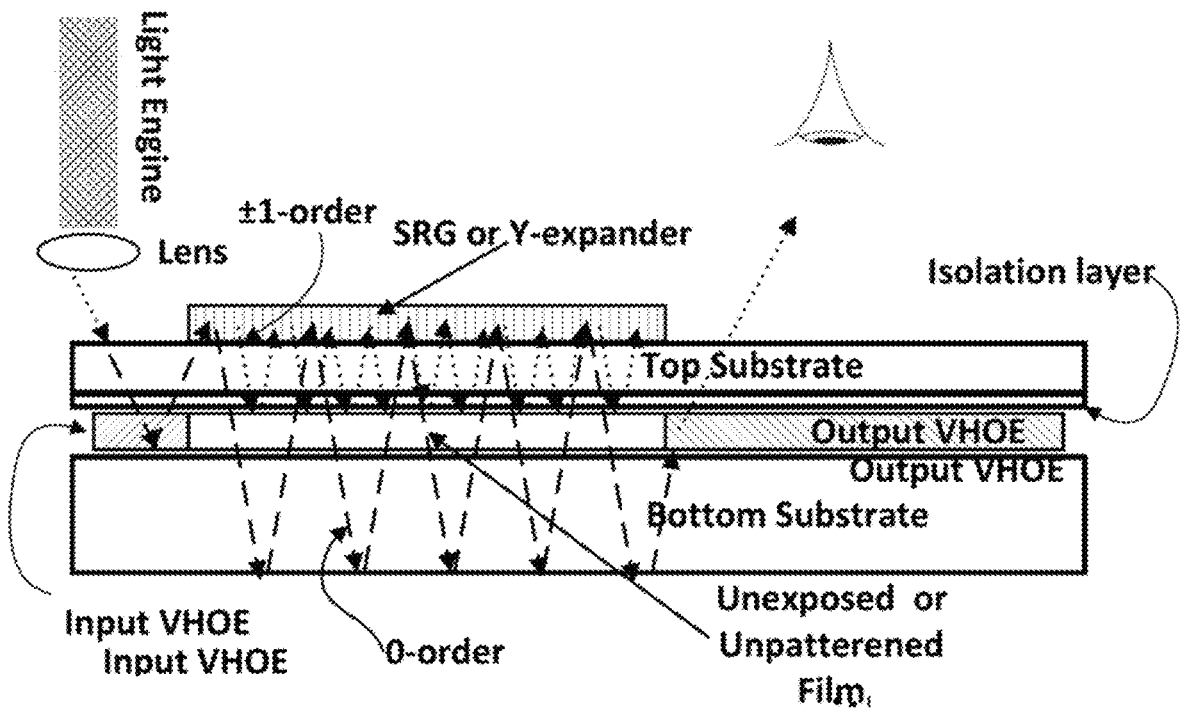
FIG. 15 shows a side view illustration of a waveguide with top and bottom substrates, an SRG or Y-expander, and an isolation layer such that $0^{th}$ order light passes between the top and bottom substrates, but first diffraction order light is trapped in the top substrate.

The present invention describes a waveguide image combiner used to transmit a monochrome or full-color image in an augmented reality display. The combiner suitably provides an expanded horizontal and vertical FOV that offers a diagonal FOV≥50°, a horizontal FOV≥40 and a vertical FOV≥25°. The combiner also delivers a large horizontal eye box up to 20 mm or greater and a vertical eye box of 10 mm or greater while maintaining high light efficiency of the real scene (e.g. >80%). The system is able to use a light engine based on broadband (10 nm≤Δλ≤40 nm) LEDs and maintain a large horizontal field of view and high transmission of the real imagery. This approach resolves issues with current embodiments including astigmatism, image overlap, color balance, image artifacts, and small light engine pupils leading to reduced eye boxes. Additionally, this approach provides for increased efficiency of light transmission from the incoupling VHOE to the outcoupling VHOE while minimizing system weight and thickness.

In one embodiment, the present invention features an optical waveguide for combining light from real imagery with light from a light engine. As a non-limiting example, the waveguide may comprise: top and bottom substrates; a pair of incoupling and outcoupling volume holographic optical elements (VHOEs); an image expander (such as a y-expander or an x-expander); and an isolation layer. The waveguide may convey light from the incoupling VHOE to the outcoupling VHOE via total internal reflection (TIR) through the combined top and bottom substrates. In a preferred embodiment, the top and bottom substrates may be positioned in a stacked orientation such that a top surface of the top substrate is parallel with a bottom surface of the bottom substrate and the areas of said parallel surfaces are substantially or entirely overlapping. The top and bottom substrates may be identical or different in shape, size, thickness, material, and refractive index. As a non-limiting example, either of the substrates may have a thickness of about 10, 20, 30, 40, 50, 60, 70, 80, 90, or 100 percent of the thickness of the other substrate. In a preferred embodiment, the top and bottom substrates may be optically coupled such that light may travel through the waveguide via (TIR) that is bounded by the top surface of the top substrate and the bottom surface of the bottom substrate.

The stacked top and bottom substrates may have a small gap between the bottom surface of the top substrate and the top surface of the bottom substrate. This gap may be filled with one or more materials which allow for the transmission of light between the two substrates. In some embodiments, the refractive index of one or more of the gap-filling (or inter-substrate) materials may be close to or identical with the refractive index of one or both of the substrates. In such embodiments, that inter-substrate material may be referred to as an index matching layer. In other embodiments, the refractive index of one or more of the inter-substrate materials may be lower than the refractive index of one or both or the substrates. In such embodiment, that inter-substrate material may be referred to as an isolation layer. The isolation layer, when used with the SRG Y-expander, may enable selective transmission and reflection of desired diffraction orders such that certain diffraction order light propagates via TIR within only one substrate, while other diffraction order light propagates via TIR within both substrates. As a non-limiting example, the isolation layer and the SRG may be designed so the $0^{th}$ order light passes through the isolation layer while the $1^{st}$ order light reflects at the isolation layer. In this case, the $1^{st}$ order light will propagate within only one substrate and will interact with the SRG more times than the $0^{th}$ order light. The additional interactions of the $1^{st}$ order with the SRG will generate additional $0^{th}$ order light, thus increasing the percentage of light that ends up in the $0^{th}$ order. If the waveguide is designed such that only $0^{th}$ order light is outcoupled from the Y-expander, then by using the isolation layer one can improve the efficiency and light distribution of the Y-expander.

In some embodiments, the pair of incoupling and outcoupling VHOEs may be spaced apart and sandwiched between the top substrate and the bottom substrate. In further embodiments, additional pairs of incoupling and outcoupling VHOEs (for example, those corresponding to different color ranges or angular ranges) may also be sandwiched between the top and bottom substrates and stacked in alignment with the first pair of incoupling and outcoupling VHOEs. The incoupling and outcoupling VHOEs may be reflection or transmission VHOEs. In one embodiment, the incoupling and outcoupling VHOEs may be patterned on a single continuous layer of material which extends between the top and bottom substrates from one end of the stacked substrates to the other and is unpatterned in the area between the incoupling and outcoupling VHOEs so as to act as an index matching layer between the incoupling and outcoupling VHOEs. Alternatively, the incoupling and outcoupling VHOEs may be patterned on separate sections of material.

The image expander may comprise a diffraction grating printed or positioned on a top surface of the top substrate, such that as the light is conveyed through the top substrate, it interacts with the image combiner so as to provide for optical expansion of a pupil. Alternatively, the image expander may be on a bottom surface of the bottom substrate. The image expander may be arranged between the incoupling and outcoupling VHOEs (either directly in-line or offset) such that light passing through the substrates from the incoupling VHOE to the outcoupling VHOE interacts with the image expander multiple times as it propagates via TIR. The image expander may be partially overlapping with the incoupling or outcoupling VHOE. In some embodiments, the image expander may comprise a diffraction grating configured to split propagating light into $0^{th}$ and $1^{st}$ diffraction orders each time the light interacts with the diffraction grating.

The isolation layer, which comprises an optically clear, low index medium, may be positioned between the top and bottom substrates. As a non-limiting example, the isolation layer may be between the layer with the incoupling and outcoupling VHOEs and either the bottom surface of the top substrate or the top surface of the bottom substrate. As an alternative non-limiting example, the isolation layer may be between the top and bottom substrates and the incoupling and outcoupling VHOEs may be positioned on the top surface of the top substrate or the bottom surface of the bottom substrate. The refractive index of the isolation layer may be selected so as to allow $0^{th}$ order light to pass from the top substrate to the bottom substrate, while reflecting $1^{st}$ diffraction order light such that it is trapped in the top substrate (or the substrate with the image expander). In one embodiment, the isolation layer may cause the $1^{st}$ diffraction order light to interact with the image expander more frequently than the $0^{th}$ order light, thereby providing for homogenization of the outcoupled light and/or an increased proportion of the transmitted light which ends up in the $0^{th}$ order (and is thus outcoupled).

The one or more layers between the top and bottom substrates (e.g. isolation layers or index matching layers) may each be applied as a film, a liquid coating (e.g. one that hardens, polymerizes, or cures), or as a deposited layer (e.g. via epitaxial growth). One or more of the inter-substrate layers (e.g. index matching layer) may have a variable thickness to compensate for irregularity of the substrates, such that a top surface of the top substrate and a bottom surface of the bottom substrate are parallel.

In one embodiment, the invention features a waveguide image combiner for combining light from real imagery with light from a light engine. As a non-limiting example, the waveguide image combiner may comprise a plurality of stacked waveguides, where each waveguide comprises: a top substrate; a bottom substrate; and a pair of incoupling and outcoupling volume holographic optical elements (VHOEs) spaced apart and sandwiched between the top substrate and the bottom substrate; where each waveguide is configured to convey light from the incoupling VHOE to the outcoupling VHOE via total internal reflection (TIR) through the combined top and bottom substrates. Each of the stacked waveguides may corresponds to one or more angular ranges and one or more color ranges. In one embodiment, for any given angular range of light, the blue and red color ranges are conveyed by a waveguide which is different from the waveguide which conveys the green color range of the same angular range of light. In another embodiment, for any given angular range of light, each color range is conveyed by a different waveguide. The stacked waveguides may be separated from each other by air gaps or low-refractive-index layers. In one embodiment, the thickness of the inter-waveguide gaps is selected such that each waveguide separately transmits light via TIR. In some embodiments, the incoupling and/or outcoupling VHOEs of each stacked waveguide may be aligned.

In one embodiment, an optical waveguide for combining light from real imagery with light from a light engine. As a non-limiting example, the waveguide may comprise: a top substrate; a bottom substrate; and a pair of incoupling and outcoupling volume holographic optical elements (VHOEs) spaced apart and sandwiched between the top substrate and the bottom substrate; wherein the waveguide is configured to convey light from the incoupling VHOE to the outcoupling VHOE via total internal reflection (TIR) through the combined top and bottom substrates. In some embodiments, the waveguide may additionally comprise an index matching medium sandwiched between the top substrate and the bottom substrate and between the incoupling and outcoupling VHOEs. In a preferred embodiment, this index matching medium may allow the top and bottom substrates to convey selected light from the incoupling VHOE to the outcoupling VHOE via TIR as if they were a single substrate. As a non-limiting example, the TIR may be bounded by the top surface of the top substrate and the bottom surface of the bottom substrate.

In some embodiments, one or more of the VHOEs may have a gradient diffraction efficiency across the propagation path. The VHOEs may comprise reflection or transmission VHOEs. In one embodiment, the optical waveguide may additionally comprise an image expander, positioned on a top surface of the top substrate or a bottom surface of the bottom substrate, such that as the light is conveyed through the waveguide, it interacts with the image combiner so as to provide for optical expansion of a pupil. As a non-limiting example, the image expander may comprise a diffraction grating such that each time the light interacts with the diffraction grating it is split into $0^{th}$ and $1^{st}$ diffraction orders.

In one embodiment, each waveguide may include an isolation layer between the top substrate and the bottom substrate, the isolation layer having a lower refractive index then that of the substrates. As a non-limiting example, the isolation layer may be configured to allow $0^{th}$ order light to pass from the top substrate to the bottom substrate, while reflecting $1^{st}$ order light such that it is trapped in the top substrate. In one embodiment, one or more of the waveguides may comprise one or more additional pairs of incoupling and outcoupling VHOEs spaced apart and sandwiched between the top substrate and the bottom substrate, such that the incoupling VHOEs are stacked in alignment and the outcoupling VHOEs are stacked in alignment. In further embodiments, the waveguides may additionally include anti-reflection coatings on one or more air-glass interfaces.

Figure 16:
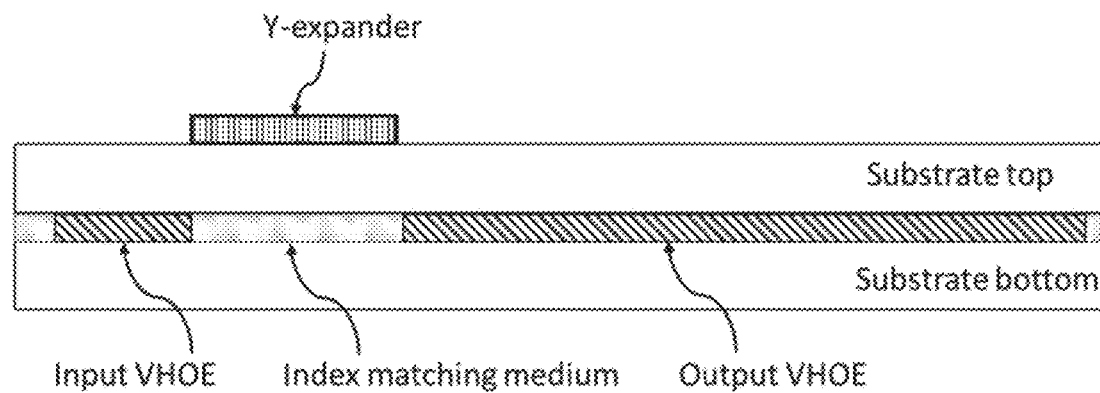
FIG. 16 shows a side view illustration of an individual waveguide with an incoupling VHOE, an index matching medium, and an outcoupling VHOE, all sandwiched between top and bottom substrates.

In some embodiments, a thickness of the top substrate may be at least 0.1, 0.2, 0.3, 0.4, 0.5, 0.6, 0.7, 0.8, 0.9, or 1.0 mm. In other embodiments, a thickness of the bottom substrate may be at least 0.1, 0.2, 0.3, 0.4, 0.5, 0.6, 0.7, 0.8, 0.9, or 1.0 mm. In some embodiments, a thickness of the top substrate may be at least 10, 15, 20, 25, 30, 35, 40, 45, 50, 55, 60, 65, 70, 75, 80, 90, 95 or 100 percent of a thickness of the bottom substrate. In other embodiments, a thickness of the bottom substrate may be at least 10, 15, 20, 25, 30, 35, 40, 45, 50, 55, 60, 65, 70, 75, 80, 90, 95 or 100 percent of a thickness of the top substrate. In still other embodiments, a combined thickness of the top and bottom substrates may be at least 10, 15, 20, 25, 30, 35, 40, 45, 50, 55, 60, 65, 70, 75, 80, 90, 95 or 98 percent of a total thickness of the waveguide. Each individual waveguide may include two glass substrates (e.g. top and bottom) with at least one pair of input VHOE and an output VHOE sandwiched between them. Each individual waveguide may also include a Y expander positioned on an outer surface (i.e. glass/air surface), of one of the two glass substrates. The geometry of a single individual waveguide is shown in FIG. 16.

For each individual waveguide, to expand the horizontal FOV, the present invention may use reflection VHOEs. Since VHOEs only have one diffraction order (as opposed to multiple orders in surface relief gratings), a more efficient use of the light may be achieved. In addition, VHOEs are able to outcouple all of the light contained in the image. High outcoupling efficiency may be achieved by fabricating a VHOE that has a gradient diffraction efficiency across the propagation path, and thus allows for an even distribution of the light to the viewer's eye. Another benefit of VHOEs is that almost all of the light is diffracted into on order, therefore, none of the light passes through to the world side of the waveguide.

For each individual waveguide, a Y expander (or X expander for horizontal expansion) may be used to expand the vertical FOV and improve the overall light transmission through the system. This may be accomplished by replicating the light engines small aperture multiple times in the vertical direction. A uniform intensity of the copies may be achieved by adjusting the intensity of each copy to an identical value. The Y expander may provide an expanded FOV of at least 25° and be compatible with the single-film input and output VHOE design. If the individual waveguide is designed to operate for a single wavelength, the y expander may be designed to optimize performance for that wavelength. If the individual waveguide is designed to operate for two or more wavelengths, then the Y expander may be designed to balance performance for the two or more wavelengths depending on the requirements for the system.

The individual waveguide may comprise an isolation layer, a thin layer of lower refractive index material, positioned between the input and output VHOE and the adjacent glass substrate surface of the substrate that houses the Y expander (top substrate). When used with the SRG image expander, the isolation layer may enable selective transmission and reflection of desired diffraction orders such that certain diffraction order propagates via TIR within only one substrate while other diffraction order propagates via TIR within both substrates. The refractive index of the isolation layer may be lower than both the glass substrate and the VHOE that it is sandwiched in between. The refractive index of the isolation layer may be set within a range of values as to create the condition such that after each interaction of the light with the y expander, the resulting $0^{th}$ order light passes through the isolation layer and $+/-1^{st}$ order light reflects from the top surface of the isolation layer via TIR. Trapping the $+/-1^{st}$ orders light to within the y expander and the isolation layer increases the number interactions the propagating light has with the y expander compared to the 0th order light. The additional interactions with the y expander may help to homogenize the light at the output of the y expander. If the waveguide is designed such that only $0^{th}$ order light is outcoupled from the Y-expander, then the isolation layer may improve the efficiency and light distribution of the Y-expander.

To construct a complete waveguide image combiner, multiple individual waveguides may be stacked on top of each other with small air gaps or low-refractive-index layers in between. The input VHOE and output VHOE from each individual waveguide may be roughly aligned to each other. The order of stacking may vary depending on the system requirements.

For example, the waveguide image combiner may include two individual waveguides both designed for green color, where the first waveguide is designed for a vertical FOV of about 35 degrees and horizontal FOV of about 18 degrees (ranging from −18 to 0 degree) and a second waveguide is designed for a vertical FOV of about 35 degrees and horizontal FOV of about 18 degrees (ranging from 0 to +18 degrees). When the two individual waveguides are stacked on top of each other with a small air gap or low-refractive-index layer, the resulting image waveguide combiner would have a vertical FOV of about 35 degrees and a horizontal FOV of about 35 degrees (there may be a small overlap between the horizontal FOVs from the two individual waveguides) or a diagonal FOV about 50 degrees.

In a second example, the waveguide image combiner may include three individual waveguides where all three are designed to have the same FOV (both vertical and horizontal), over the same angular range. Each of the three individual waveguides may correspond to a different color, one for the red wavelength band, one for the green wavelength band and one for blue wavelength band. When the three individual waveguides are stacked on top of each other with small air gaps or low-refractive-index layers between the waveguides, the resulting image waveguide combiner may operate in full color.

Figure 17:
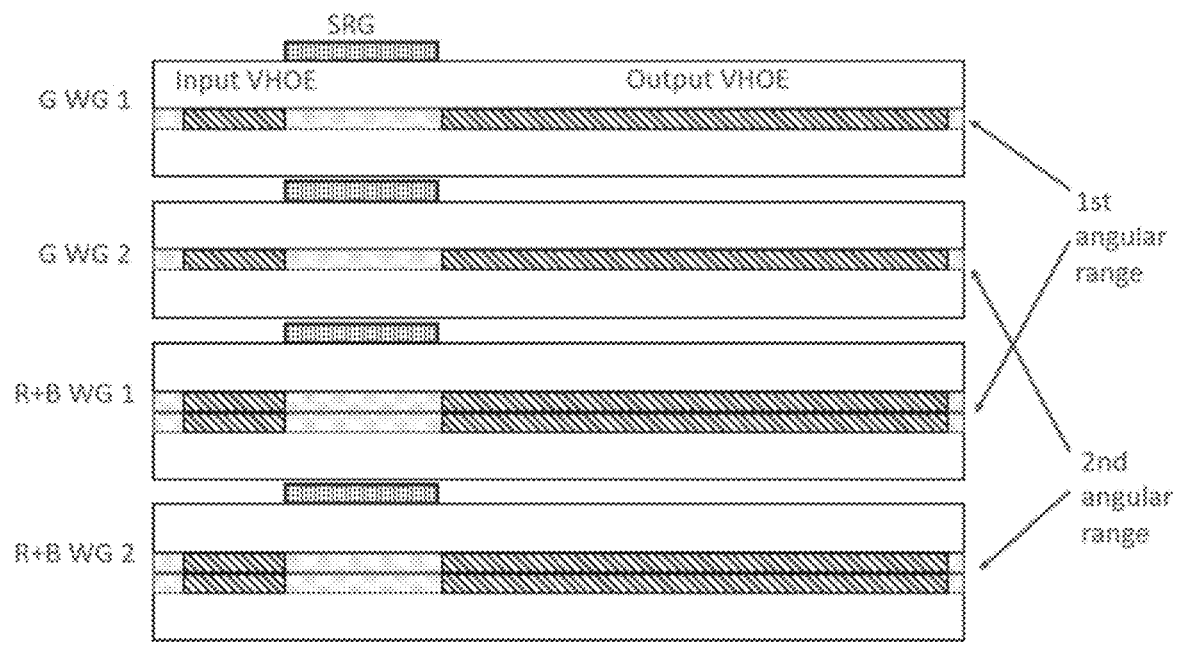
FIG. 17 shows a side view illustration of a waveguide image combiner formed by stacking a plurality of waveguides which each has top and bottom substrates, and each corresponds to an angular range and one or more color ranges.

One preferred embodiment features a full color, 50 (of more) degree diagonal FOV waveguide image combiner constructed by stacking four individual waveguides. Two of the individual waveguides may be designed for the FOV of a first angular range and two of the individual waveguides are designed for the FOV of a second, adjacent, angular range. For the two individual waveguides of each angular range, first one may correspond to a green wavelength band and second one may correspond to both red and blue wavelength bands. It may be advantageous to have the green wavelength in a separate waveguide as to the red and blue wavelengths. When multiple wavelengths bands interact with VHOEs in a single waveguide, there can be crosstalk if the wavelength bands are near each other, for example between red and green or between green and blue. However, this crosstalk is reduced with the wavelength bands are further apart, for example between red and blue. The four individual waveguides may be stacked together to form the final image combiner. There are many other possible stacking geometries. In fact, any stacking order can be made to work as long as the input and output couplers are aligned. For this preferred embodiment, the two individual waveguides designed for the same wavelength band may be stacked next to each other as shown in FIG. 17. This preferred stacking geometry is advantageous because the two waveguides that are designed for the same color may see a smaller change in the input beam coming from the light engine in the form of beam profile and beam intensity, and therefore provide for better uniformity in the image.

For this preferred embodiment, the two waveguides designed for the two angular ranges for the green color range may each include one pair of input and output VHOEs. The two waveguides designed for the two angular ranges for the red and blue color ranges may each include two stacked pairs of input and output VHOEs. All four waveguides may include a Y expander in between the input and output VHOEs. The Y expander may be a surface relief grating. The areas between the top and bottom substrates and between the input and output VHOEs may be filled with optically transparent material that has the same index of refraction as the input and output VHOEs.

Figure 18:
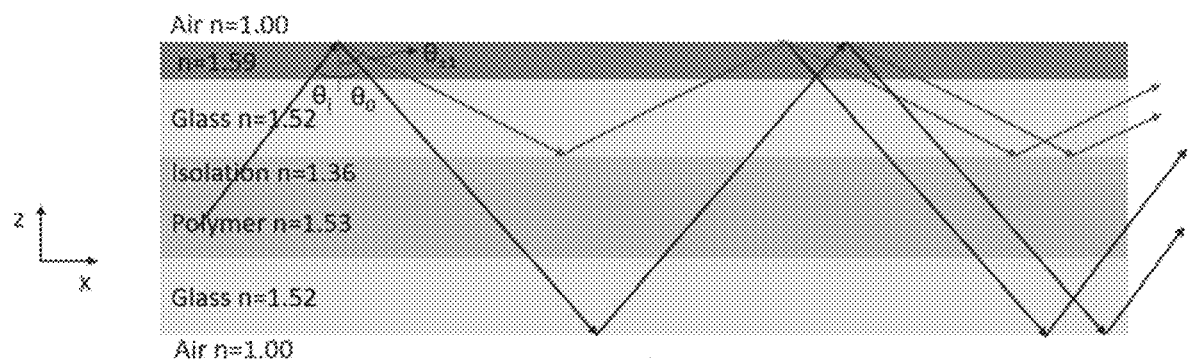
FIG. 18 shows the paths of light traveling through a waveguide via total internal reflectance (TIR). The refractive index of each material is shown, and the differences of refractive index are such that $0^{th}$ order light passes freely between the top and bottom substrates, while first diffraction order light is trapped in the top substrate.

In one preferred embodiment, an isolation layer may be used in each individual waveguide. This isolation layer may be physically located between the glass substrate that has the SRG (the top substrate) and the VHOE photopolymer layer (on the bottom layer). The isolation layer may be a thin layer of optical transparent material that has an index of refraction lower than the top substrate. The exact index of refraction of the isolation layer may be chosen so as to create a condition where the 0th order light passes through the isolation layer, but light from 1st orders reflects off the isolation layer via TIR as shown in FIG. 18. For the same distance traveled, the isolation layer may effectively increase the number of TIR reflections for the first orders. For one preferred embodiment, it may be advantageous to use anti-reflection coatings on all of the air-and-glass interfaces. The Fresnel reflections from multiple air-and-glass interfaces may accumulate to degrade the overall efficiency, and increase light leakage on the world side of the combiner.

Figure 19:
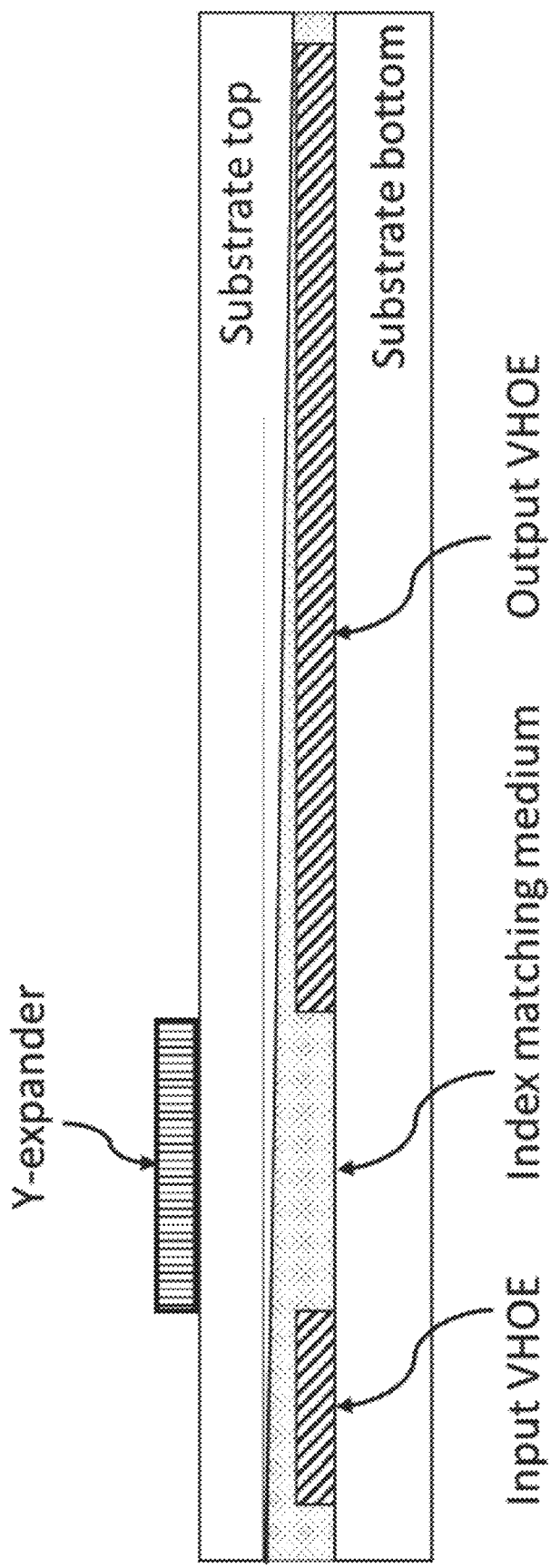
FIG. 19 shows an illustration of how the inclusion of an index matching medium between two stacked substrates can correct for surface irregularities and position the two outer surfaces of the substrates in a parallel alignment even if each of the substrates is not perfectly uniform in thickness.

For each individual waveguide, the light travels from the input VHOE to the output VHOE via TIR. This requires the two optical surfaces of the waveguide to be flat and parallel to each other. If the two optical surfaces are not perfectly flat and parallel to each other, different wavelengths of light will encounter non-identical dispersion as the light propagates. This may lead to blurring of the image and separation of the colors. As such, to construct waveguides, it is customary to use high-quality glass substrates that are flat and parallel. Such high-quality glass substrates are typically polished on both sides and are more expensive than unpolished substrates. An alternative method to achieve parallel surfaces in a waveguide using imperfect glass substrates (that may be slightly wedged in shape) is to compensate for the thickness variations in the glass substrate with the opposite variation in the gap in between the two glass substrates. This gap may be filled with some type of index-matching material, such as optically clear adhesive, laser liquid, or microscope immersion oil. This is shown in FIG. 19. During construction, light reflection from the top surface of the top substrate and bottom surface of the bottom substrate may be monitored to ensure those two surfaces are positioned parallel to each other while the adhesive cures. Alternatively, a mechanical jig may be used to ensure the parallelism of those surfaces during curing.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. An optical waveguide for combining light from real imagery with light from a light engine, the optical waveguide comprising:
   a. a top substrate;
   b. a bottom substrate, stacked in alignment with the top substrate;
   c. a pair of incoupling and outcoupling volume holographic optical elements (VHOEs) spaced apart and sandwiched between the top substrate and the bottom substrate;
   d. an image expander comprising a diffraction grating positioned on a top surface of the top substrate, such that as the light is conveyed through the top substrate, the light interacts with the image expander so as to provide for optical expansion of a pupil; and
   e. an isolation layer, having a lower refractive index than that of the top and bottom substrates, positioned between the top and bottom substrates;
   wherein the optical waveguide is configured to convey light from the incoupling VHOE to the outcoupling VHOE via total internal reflection (TIR) through the combined top and bottom substrates,
   wherein each time the light interacts with the diffraction grating the light is split into 0th and 1st diffraction orders, and
   wherein the isolation layer is configured to allow 0th order light to pass from the top substrate to the bottom substrate, while reflecting 1st diffraction order light such that the 1st diffraction order light is trapped in the top substrate.

2. The optical waveguide of claim 1, additionally comprising an index matching medium sandwiched between the top substrate and the bottom substrate and between the incoupling and outcoupling VHOEs.

3. The optical waveguide of claim 1, wherein the isolation layer causes the 1st diffraction order light to interact with the image expander more frequently than the 0th order light, thereby providing for homogenization of the outcoupled light.

4. A waveguide image combiner for combining light from real imagery with light from a light engine, said waveguide image combiner comprising:
   a. a plurality of stacked waveguides, each waveguide comprising:
      i. a top substrate;
      ii. a bottom substrate, stacked in alignment with the top substrate;
      iii. a pair of incoupling and outcoupling volume holographic optical elements (VHOEs) spaced apart and sandwiched between the top substrate and the bottom substrate; and
      iv. an image expander aligned to be parallel to the top substrate and the bottom substrate, aligned at least partially between the pair of incoupling and outcoupling VHOEs, and positioned on a surface of the top substrate or the bottom substrate,
   wherein each waveguide is configured to convey light from the incoupling VHOE to the outcoupling VHOE via total internal reflection (TIR) through the combined top and bottom substrates,
   wherein each of the stacked waveguides corresponds to one or more angular ranges and one or more color ranges, and
   wherein for any given angular range of light, the blue and red color ranges are conveyed by one of the plurality of stacked waveguides which is different from the waveguide which conveys the green color range of the same angular range of light.

5. The waveguide image combiner of claim 4, wherein the stacked waveguides are separated from each other by air gaps or low-refractive-index layers.

6. The waveguide image combiner of claim 4, wherein each waveguide comprises an isolation layer between the top substrate and the bottom substrate, the isolation layer having a lower refractive index than that of the top substrate and the bottom substrate.

7. An optical waveguide for combining light from real imagery with light from a light engine, the optical waveguide comprising:
   a. a top substrate;
   b. a bottom substrate, stacked in alignment with the top substrate such that a top surface of the top substrate and a bottom surface of the bottom substrate are parallel;
   c. a pair of incoupling and outcoupling volume holographic optical elements (VHOEs) spaced apart and sandwiched between the top substrate and the bottom substrate; and
   d. an image expander aligned to be parallel to the top substrate and the bottom substrate, aligned at least partially between the pair of incoupling and outcoupling VHOEs, and positioned on the top surface of the top substrate or the bottom surface of the bottom substrate, wherein the optical waveguide is configured to convey light from the incoupling VHOE to the outcoupling VHOE via total internal reflection (TIR) through the combined top and bottom substrates.

8. The optical waveguide of claim 7, additionally comprising an index matching medium sandwiched between the top substrate and the bottom substrate and between the incoupling and outcoupling VHOEs, and wherein the index matching medium allows the top and bottom substrates to convey light from the incoupling VHOE to the outcoupling VHOE via TIR as if they were a single substrate.

9. The optical waveguide of claim 8, wherein the index matching medium has a variable thickness to compensate for irregularity of the top substrate and the bottom substrate such that the top surface of the top substrate and the bottom surface of the bottom substrate are parallel.

10. The optical waveguide of claim 7, wherein one or more of the VHOEs has a gradient diffraction efficiency across a propagation path of the light.

11. The optical waveguide of claim 7, wherein one or more of the VHOEs comprises a reflection VHOE.

12. The optical waveguide of claim 7, wherein the image expander is positioned such that as the light is conveyed through the optical waveguide, the light interacts with the image expander so as to provide for optical expansion of a pupil.

13. The optical waveguide of claim 12, wherein the image expander comprises a diffraction grating and each time the light interacts with the diffraction grating the light is split into 0th and 1st diffraction orders.

14. The optical waveguide of claim 12, wherein the outcoupling VHOE only outcouples 0th diffraction order light.

15. The optical waveguide of claim 12, wherein each waveguide comprises an isolation layer between the top substrate and the bottom substrate, the isolation layer having a lower refractive index than that of the top substrate and the bottom substrate.

16. The optical waveguide of claim 15, wherein the index of refraction of the isolation layer and image expander grating period is configured to allow 0th order light to pass from the top substrate to the bottom substrate, while reflecting 1st order light such that the 1st order light is trapped in the top substrate.

17. The optical waveguide of claim 7, comprising one or more additional pairs of incoupling and outcoupling VHOEs spaced apart and sandwiched between the top substrate and the bottom substrate, wherein the incoupling VHOEs are stacked in alignment and the outcoupling VHOEs are stacked in alignment.

18. The optical waveguide of claim 7, additionally comprising anti-reflection coatings on a bottom surface of the top substrate or a top surface of the bottom substrate.

19. The optical waveguide of claim 7, wherein the top surface of the top substrate and the bottom surface of the bottom substrate were polished or surface-etched prior to or after stacking of the top substrate and the bottom substrate, so as to enhance surface uniformity of the waveguide.

20. The optical waveguide of claim 7, wherein the top and bottom substrates are aligned via a mechanical jig or via a method which involves measurement of one or more optical properties of the optical waveguide to guide alignment.

* * * * *